United States Patent
Jain et al.

(10) Patent No.: US 11,531,534 B1
(45) Date of Patent: Dec. 20, 2022

(54) EXPRESS UPDATE DEPLOYMENT SYSTEM

(71) Applicant: Dell Products L.P., Round Rock, TX (US)

(72) Inventors: Shailesh Jain, Bangalore (IN); Tanmay Ranawat, Udaipur (IN); Kushagra Misra, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 3 days.

(21) Appl. No.: 17/354,243

(22) Filed: Jun. 22, 2021

(51) Int. Cl.
*G06F 8/65* (2018.01)

(52) U.S. Cl.
CPC .................... *G06F 8/65* (2013.01)

(58) Field of Classification Search
USPC ........................................................ 717/173
See application file for complete search history.

(56) References Cited

U.S. PATENT DOCUMENTS

| | | | |
|---|---|---|---|
| 9,081,643 B2* | 7/2015 | Wang | G06F 8/65 |
| 10,721,125 B2* | 7/2020 | Kovacheva | H04L 41/12 |
| 2012/0198434 A1* | 8/2012 | Dirstine | G06F 8/65 |
| | | | 717/172 |
| 2012/0198435 A1* | 8/2012 | Dirstine | G06F 8/65 |
| | | | 717/172 |
| 2018/0275982 A1* | 9/2018 | Hunt | H04W 4/70 |
| 2019/0138295 A1* | 5/2019 | Agerstam | H04L 12/66 |
| 2022/0147337 A1* | 5/2022 | Michelsohn | G06F 11/1433 |

OTHER PUBLICATIONS

Feng, Lv, Chunlin, Gao and Kaiyang, Ma. "Unstructured P2P Network Load Balance Strategy Based on Multilevel Partitioning of Hypergraph" Open Physics 15, No. 1, pp. 225-232; 2017 (Year: 2017).*

* cited by examiner

*Primary Examiner* — Qing Chen
*Assistant Examiner* — Clint Thatcher
(74) *Attorney, Agent, or Firm* — Kirton McConkie; Brian Tucker (57) ABSTRACT

An express update deployment system can enable a larger number of computing devices to be updated during a time window. When an update is to be deployed to computing devices, a management server can select a set of the computing devices to function as proxy file repositories. The management server can select the set of computing devices based on hardware details of the computing devices that are to be updated. The management server can prioritize the deployment of the update to the selected set of computing devices. Once the update has been deployed on the selected set of computing devices, the computing devices can commence functioning as proxy file repositories. The management server can then instruct other computing devices to obtain parts of the update from the computing devices that are functioning as proxy file repositories. The management server can also instruct other computing devices to concurrently obtain the update from the file repository.

18 Claims, 12 Drawing Sheets

File Part Mappings

| Source | Destination | File Part | Secure Token |
|--------|-------------|-----------|--------------|
| 120-1  | 120-101     | Part 1    | Token1       |
| 120-1  | 120-101     | Part 2    | Token2       |
| 120-2  | 120-101     | Part 3    | Token3       |
| ...    | ...         | ...       | ...          |
| 120-50 | 120-136     | Part 3    | TokenX       |
| 120-55 | 120-172     | Part 7    | TokenY       |
| ...    | ...         | ...       | ...          |
| 120-1  | 120-200     | Part 10   | TokenN       |

FIG. 5

EXPRESS UPDATE DEPLOYMENT SYSTEM

CROSS-REFERENCE TO RELATED APPLICATIONS

N/A

BACKGROUND

Figure 1:
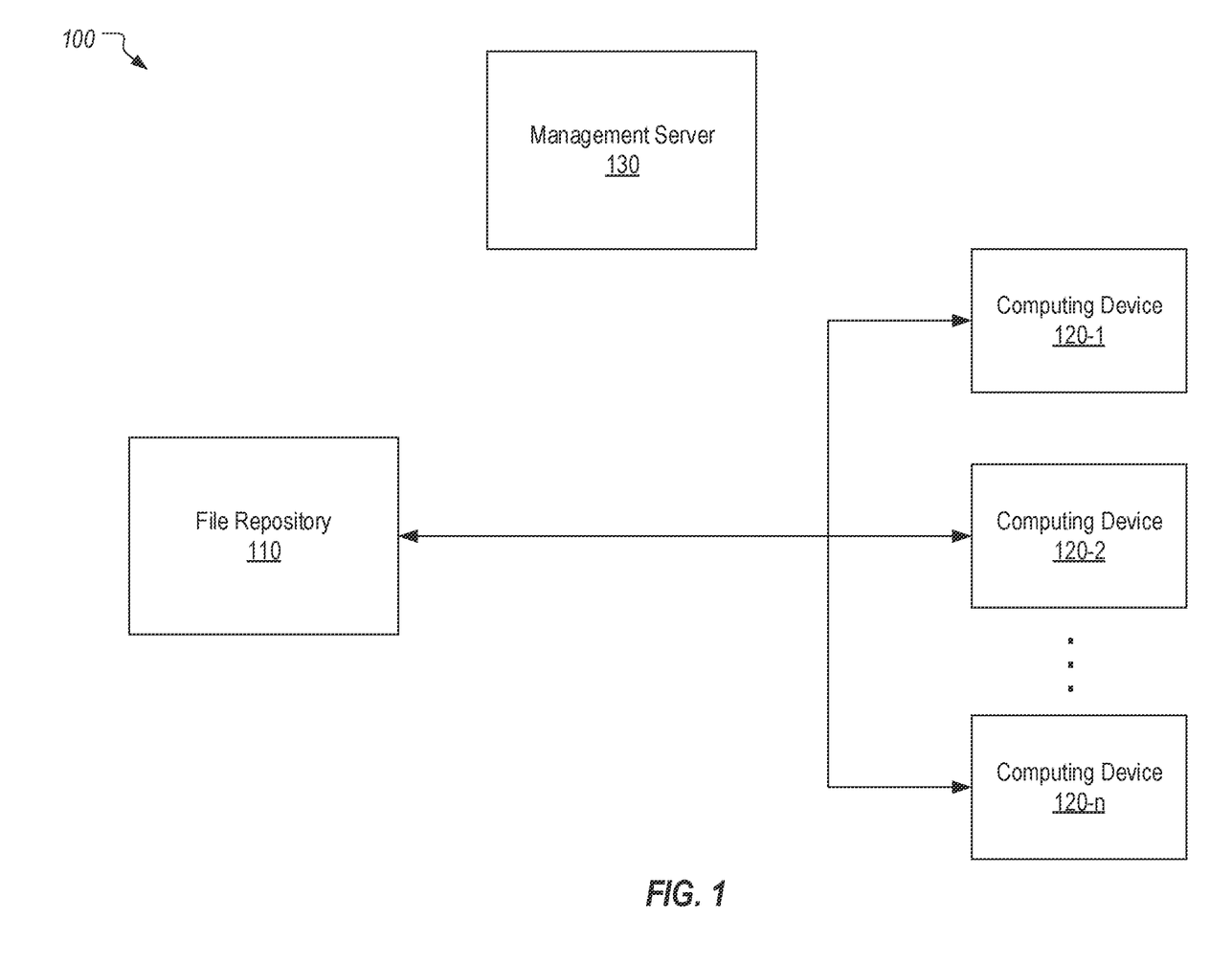
FIG. 1 provides an example of how a file repository may be used to deploy an update to computing devices.

File repositories may be used to deploy updates to computing devices. FIG. 1 provides an example of a computing environment 100 in which a file repository 110 deploys updates to computing devices 120 that are part of the same private network. In a typical scenario, an administrator may use management server 130 to schedule the deployment of an update on computing devices 120. For example, management server 130 could instruct a management agent (not shown) installed on each computing device 120 to download the update from file repository 110 within a particular time window. By scheduling the deployment of the update within a time window, management server 130 can minimize the impact of deploying the update (e.g., by scheduling the deployment during non-business hours).

File repository 110 will typically have a limit on the number of concurrent downloads it can support (e.g., 100). If the limit is reached when a computing device 120 attempts to download the update, file repository 110 may require the computing device 120 to wait in a job queue. Given that the wait time is proportional to the size of the update, the deployment of a larger update can result in excessive wait times. Oftentimes, these excessive wait times may prevent some computing devices 120 from downloading the update within the scheduled time window.

As an example, management server 130 could schedule the deployment of an update that is 1 GB in size to 1000 computing devices 120 and may specify that the update should be completed within a four-hour time window. Assuming that file repository 110 has a limit of 100 concurrent downloads and that each download of the update requires 1 hour, it would require 10 hours to complete the deployment of the update to all 1000 computing devices 120 (i.e., 100 computing devices 120 could download the update each hour). However, since the deployment is scheduled to be completed within a four-hour time window, the update will be deployed to only 400 of the 1000 computing devices 120 when the time window closes. It would therefore be necessary to schedule the deployment of the update to the remaining 600 computing devices 120 at another time. In the case of a critical update, it may be necessary to immediately schedule the deployment even if it is during business hours. This can lead to a reduction in productivity and network congestion. Although this issue could be addressed by using more file repositories, many organizations do not have the means to purchase and maintain a sufficient number of file repositories.

BRIEF SUMMARY

The present invention extends to an express update deployment system and methods and computer program products for implementing an express update deployment system. When an update is to be deployed to computing devices, a management server can select a set of the computing devices to function as proxy file repositories. The management server can select the set of computing devices based on hardware details of the computing devices that are to be updated. The management server can prioritize the deployment of the update to the selected set of computing devices. Once the update has been deployed on the selected set of computing devices, the computing devices can commence functioning as proxy file repositories. The management server can then instruct other computing devices to obtain parts of the update from the computing devices that are functioning as proxy file repositories. The management server can also instruct other computing devices to concurrently obtain the update from the file repository.

In some embodiments, the present invention may be implemented as a method for deploying an update to computing devices. A first set of the computing devices can be identified based on hardware details of the computing devices. The first set of the computing devices can be instructed to obtain the update from a file repository. In response to the first set of the computing devices obtaining the update from the file repository, a second set of the computing devices can be instructed to obtain the update from the first set of the computing devices.

In some embodiments, the present invention may be implemented as a method for deploying an update to computing devices. A first set of the computing devices can obtain the update from a file repository. The first set of the computing devices can receive requests to function as proxy file repositories. The requests can include file part mappings. The first set of the computing devices can receive, from a second set of the computing devices, requests for parts of the update. The first set of the computing devices can use the file part mappings to verify the requests for the parts of the update. Upon verifying the requests for the parts of the update, the first set of the computing devices can send the parts of the update to the second set of the computing devices.

In some embodiments, the present invention may be implemented as computer storage media storing computer executable instructions which when executed implement a method for deploying an update to computing devices. A management server can identify a first set of the computing devices based on hardware details of the computing devices. The management server can instruct the first set of the computing devices to obtain the update from a file repository. In response to the first set of the computing devices obtaining the update from the file repository, the management server can instruct a second set of the computing devices to obtain parts of the update from the first set of the computing devices. The management server can also instruct a third set of the computing devices to obtain the update from the file repository while the second set of the computing devices obtain the parts of the update from the first set of the computing devices.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

An express update deployment system that is configured in accordance with one or more embodiments of the present invention may allow a larger number of computing devices to be updated within a given time window without employing additional file repositories. For example, an express update deployment system could be implemented using a single file repository and could be capable of deploying large updates to a large number of computing devices in relatively short time windows. As a result, an entity can successfully deploy an update to all of its computing devices during non-business hours and/or without jeopardizing productivity.

Figure 2:
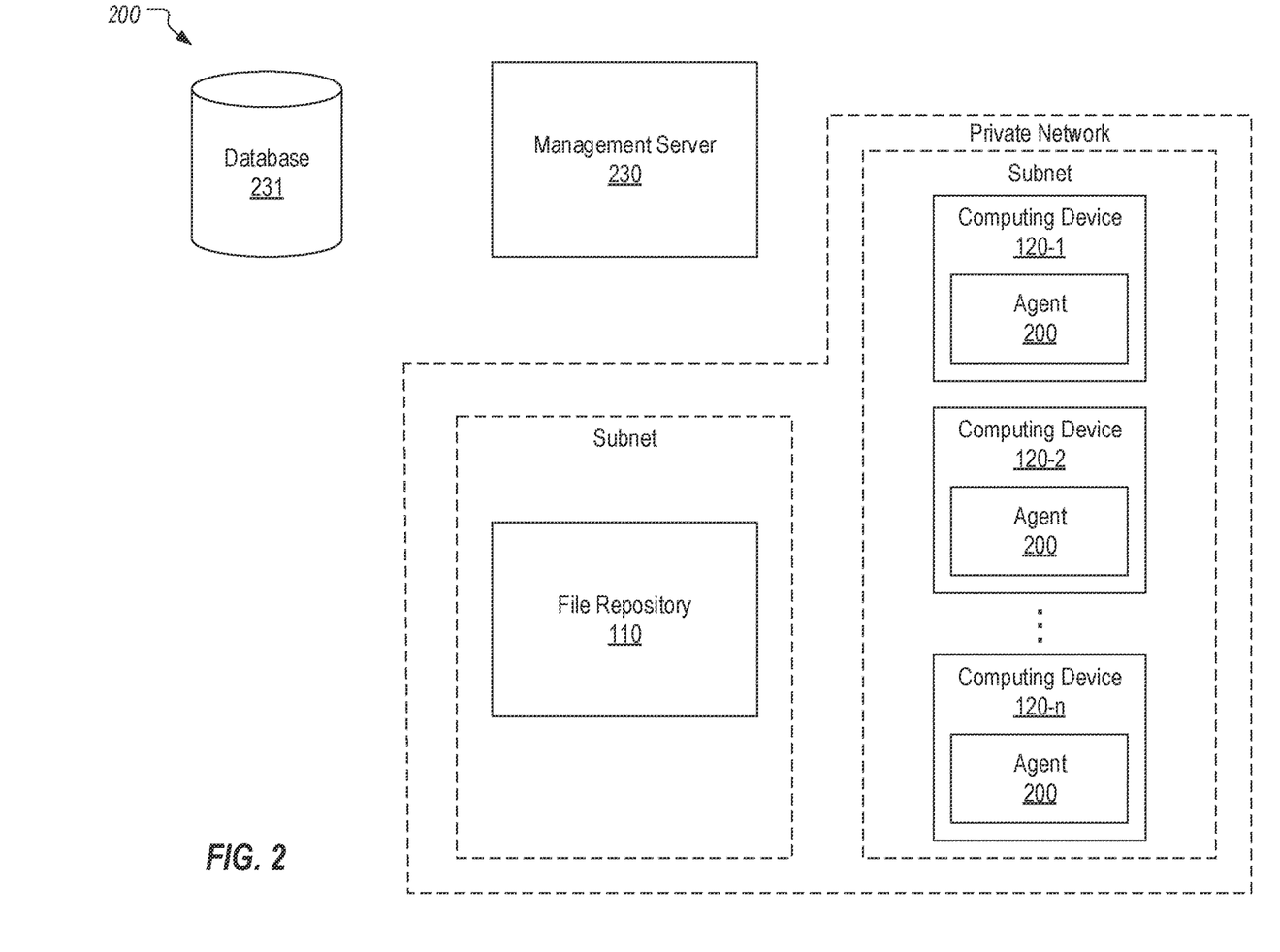
FIG. 2 illustrates an example computing environment in which an express update deployment system can be implemented in accordance with one or more embodiments of the present invention.

FIG. 2 provides an example of a computing environment 200 in which an express update deployment system may be implemented in accordance with one or more embodiments of the present invention. Computing environment 200 includes a number of computing devices 120-1 through 120-n where n may typically be, but need not be, a large number (e.g., hundreds or thousands of computing devices). In some cases, computing devices 120 may be part of the same subnet or may be divided amongst multiple subnets of a private network. A file repository 110 may also be part of the same private network and may be on a separate subnet. However, the depicted network configuration is one example only and embodiments of the present invention should not be limited by or to any particular network configuration.

Computing environment 200 also includes a management server 230 and a database 231. Database 231 may represent any storage mechanism that management server 230 may employ to maintain the data/information described herein. An agent 200 may be installed on each computing device 120 and may be configured to interface with management server 230 to perform the functionality described herein.

As an overview of one or more embodiments of the present invention, when an update is to be deployed to computing devices 120, management server 230 can select a set of computing devices 120 that will function as proxy file repositories for distributing the update to other computing devices 120. Management server 230 may select this set of computing devices 120 based on hardware details of the computing devices 120 to be updated. Management server 230 may also divide an update into parts and cause each proxy file repository to host only parts of the update for distribution to particular computing devices 120. By distributing an update via a file repository and proxy file repositories, an express update deployment system can greatly increase the number of computing devices 120 that can be updated in a time window.

Figure 3A:
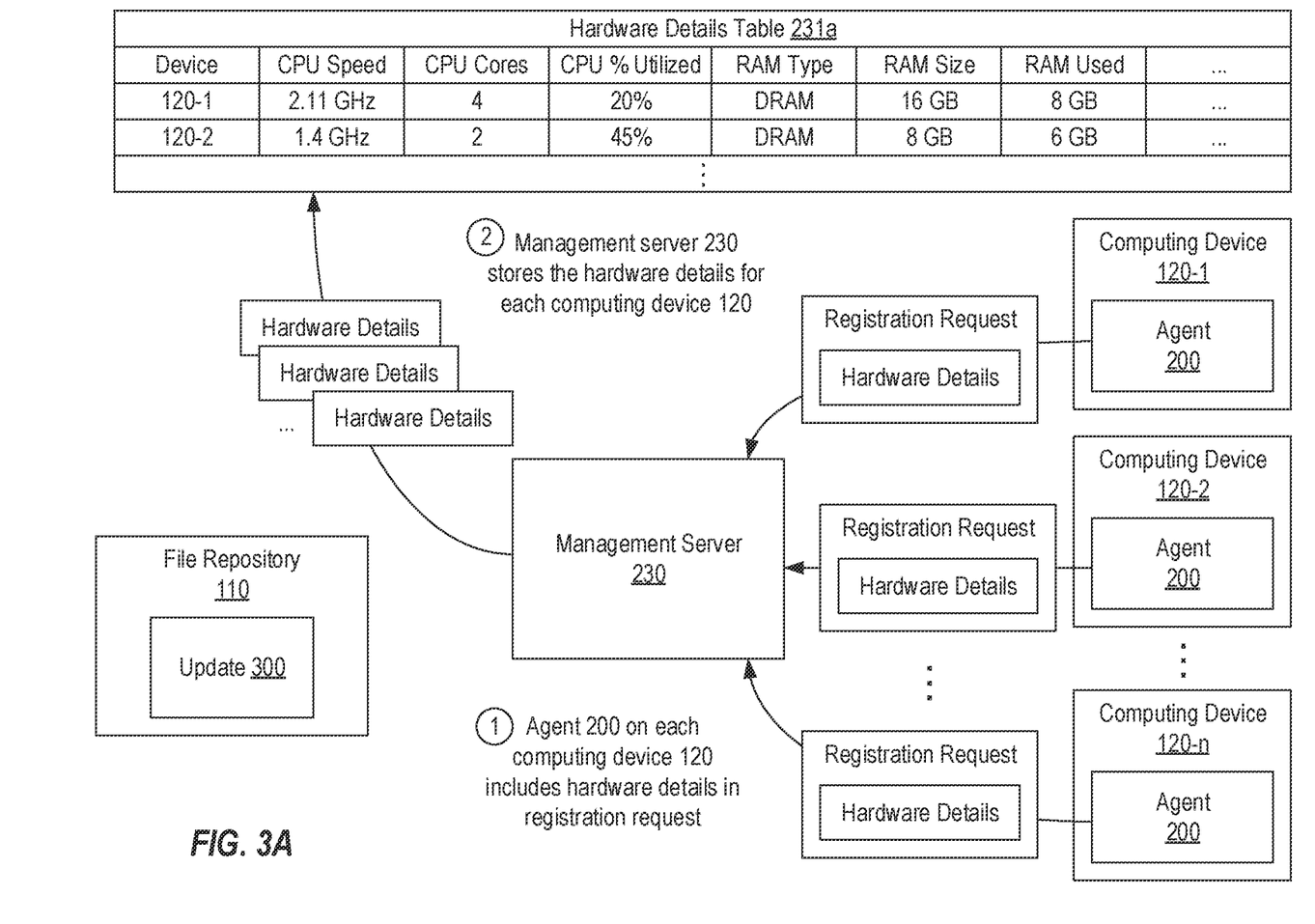
FIGS. 3A-3C provide an example of some functionality a management server may perform in preparation for deploying an update via an express update deployment system in accordance with one or more embodiments of the present invention.
Figure 3B:
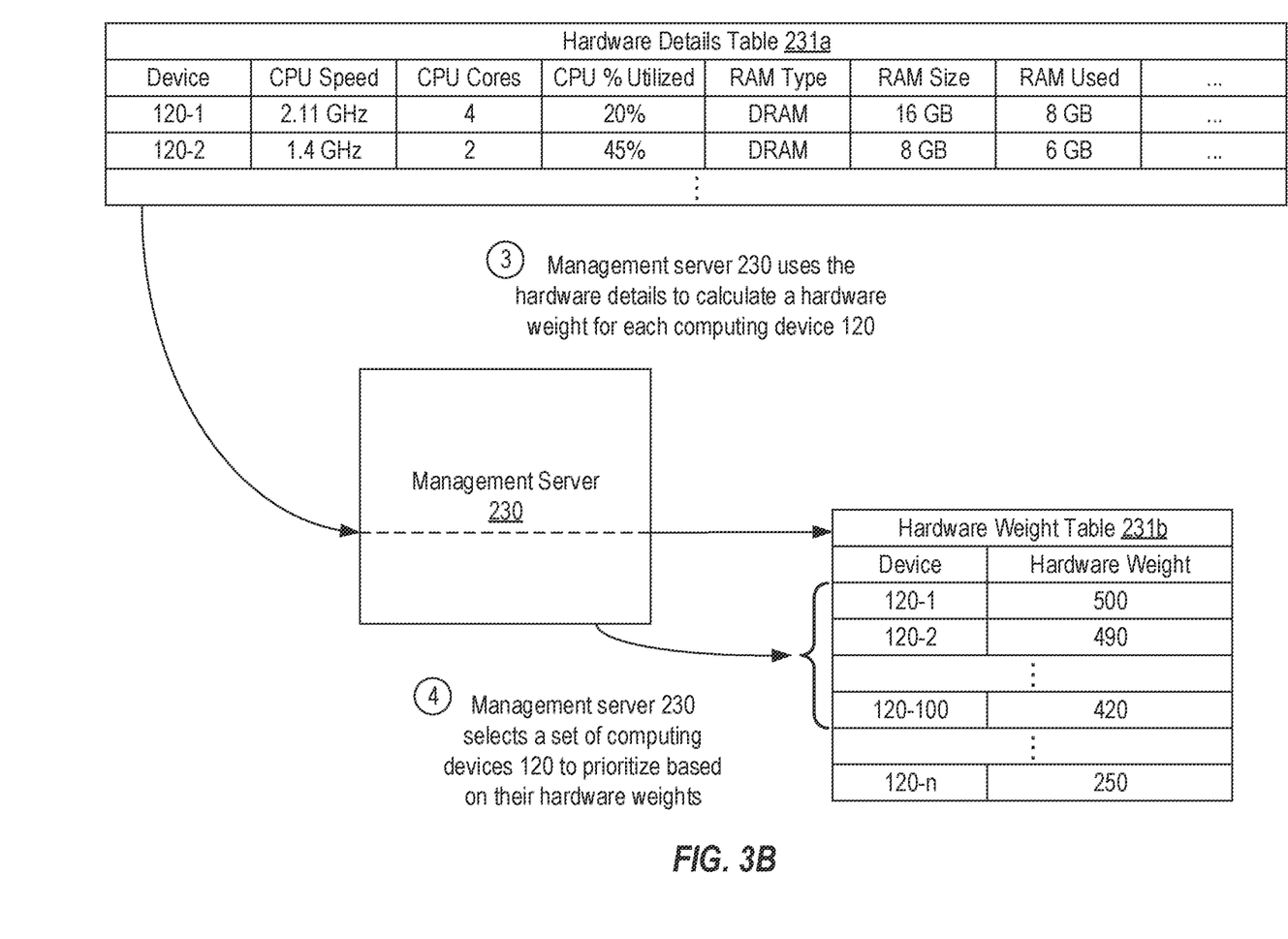
Figure 3C:
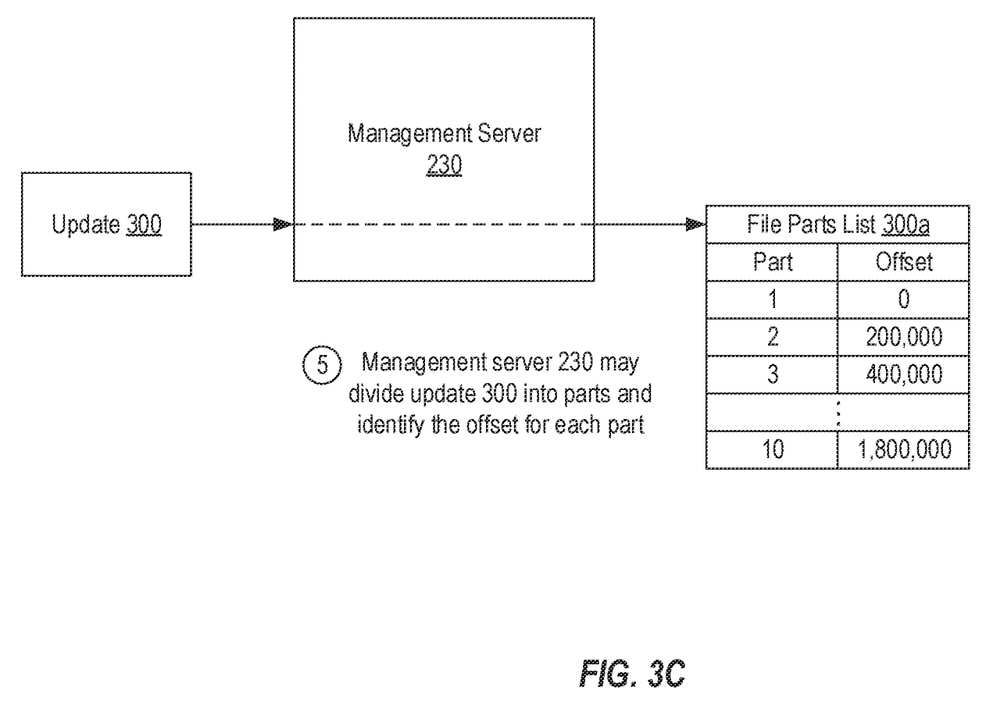

FIGS. 3A-3C provide an example of functionality that management server 230 may perform in one or more embodiments of the present invention in preparation for the deployment of an update 300. As shown in FIG. 3A, update 300 may be stored on file repository 110. For purposes of this example, it will be assumed that update 300 is 2 GB in size. However, an update of any size could be deployed.

In step 1 shown in FIG. 3A, agent 200 on each of computing devices 120 sends a registration request to management server 230. These registration requests can include hardware details for the respective computing device 120. These registration requests could be sent at any reasonable time but may preferably be sent as part of the scheduling of the deployment of update 300 so that the hardware details reflect a current hardware state of the respective computing device 120. In some embodiments, the hardware details may include details of the computing device's CPU (CPU details) and details of the computing device's RAM (RAM details). For example, the CPU details could include a speed, a number of cores, a percentage of utilization (whether current, averaged, or otherwise), etc. RAM details could include a RAM type, the size, the amount used, etc. In some embodiments, the hardware details could include disk details and/or network details.

In step 2, management server 230 can store the hardware details it receives from agent 200 on each computing device 200. For example, management server 230 could maintain a hardware details table 231a in database 231 which associates an identifier of each computing device 120 with its hardware details. For example, hardware details table 231a represents that device 120-1 has a CPU with four cores, a frequency of 2.11 GHZ and 20% utilization and 16 GB of DRAM of which 8 GB is used.

Turning to FIG. 3B, after collecting the hardware details of computing devices 120 to which update 300 is to be deployed, in step 3, management server 230 may use the hardware details to calculate a hardware weight for each computing device 120. For example, management server 230 could generate/update hardware weight table 231b which associates a hardware weight with an identifier of each computing device 120.

In some embodiments, the hardware weight (HW) can be calculated as the sum of a CPU weight (CW) and a RAM weight (RW) as follows.

$$HW=CW+RW$$

In some embodiments, the CPU weight (CW) can be calculated as follows.

$$CW=(100-\text{CPU \% Utilized})*(\text{No. of Cores})*(\text{CPU Speed})$$

In some embodiments, the RAM weight (RW) can be calculated as follows.

$$RW=(\text{RAM Type Weight Value})*(\text{RAM Size}-\text{RAM Used})$$

Regardless of any formula that management server 230 may employ to generate the hardware weights for each computing device 120, in step 4, management server 230 can select a set of computing devices 120 to prioritize based on their hardware weights. For example, in some embodiments, management server 230 may select, for an initial set, a number of computing devices 120 having the highest hardware weights where the number is equal to the maximum number of concurrent downloads that file repository 110 supports. In this example, it is assumed that file repository 110 supports 100 concurrent downloads and therefore, in step 4, management server 230 selects a set of 100 computing devices 120 having the highest hardware weights. For simplicity, it is assumed that computing devices 120-1 through 120-100 have the highest hardware weights. However, management server 230 could also select a number of computing devices 120 to prioritize that does not match the maximum number of concurrent downloads that file repository 110 supports.

Turning to FIG. 3C, in step 5, management server 230 may divide update 300 into multiple parts (or chunks) and may identify the offset of each part. For example, in FIG. 3C, management server 230 is shown as creating a file parts list 300a that identifies 10 parts of equal size for update 300. Because the parts have the same size and because update 300 is assumed to be 2 GB in size, the offsets are in 200,000 byte increments. In some embodiments, management server 230 could create parts of different sizes. For example, if update 300 is comprised of multiple individually installable files (e.g., a .exe that includes multiple .msi files), the parts may constitute these multiple individually installable files.

In some embodiments, management server 230 may select the number of parts based on the hardware details of computing devices 120. For example, management server 230 could select the number of parts by dividing the maximum hardware weight by the minimum hardware weight of computing devices 120 to which update 300 will be deployed. With such a technique, update 300 will be divided into more parts when there is a larger difference between the computing devices 120 with the highest and lowest computational powers respectively. In embodiments where the hardware details are used to determine the number of parts into which update 300 is divided, management server 230 could employ a default minimum number of parts such as 10. As described in further detail below, management server 230 may divide update 300 into parts based on hardware weights of a current set of computing devices 120 to which update 300 will be distributed (i.e., different file parts could be defined for different sets of computing devices 120 and/or at different iterations of the update process).

Figure 4A:
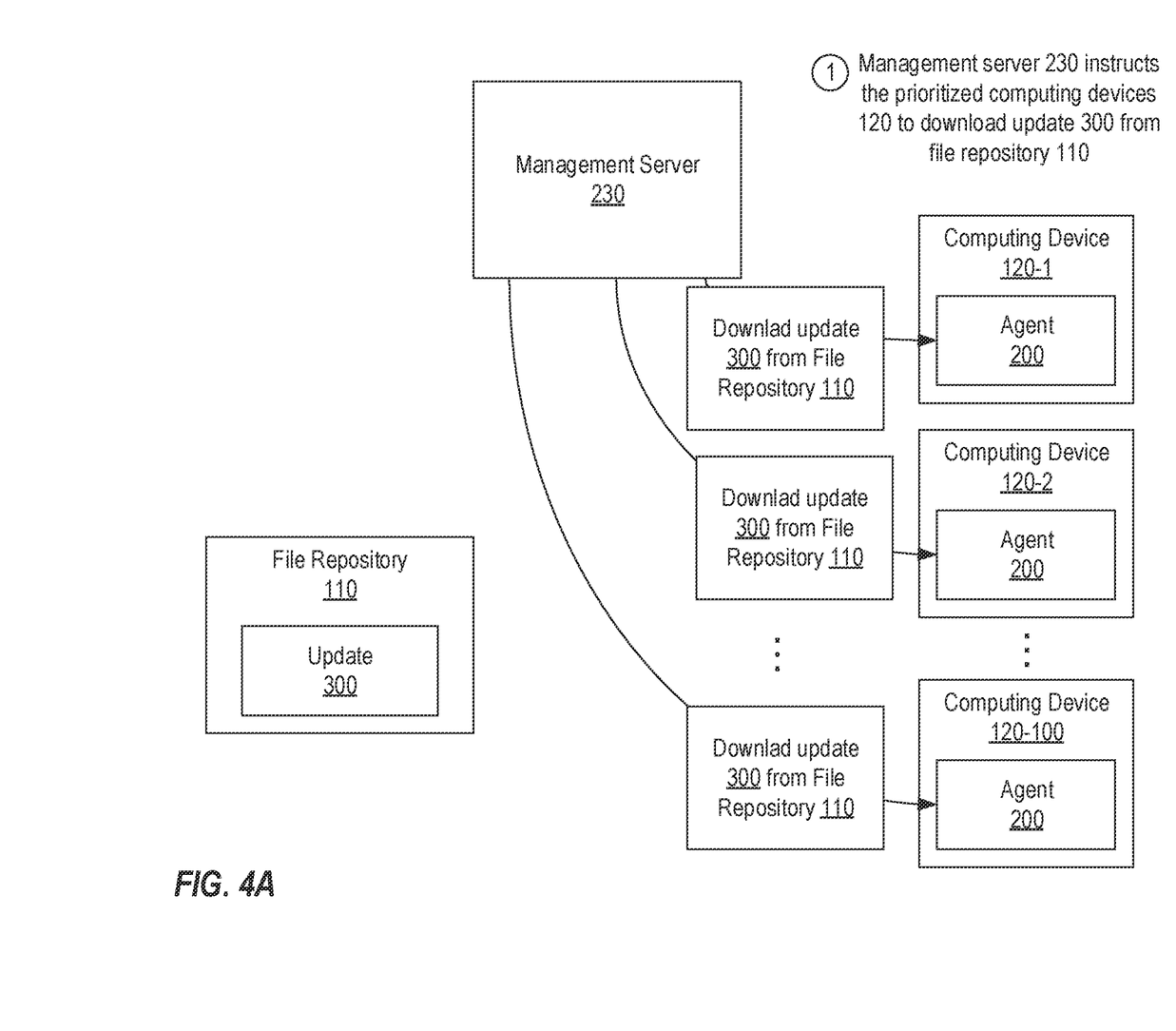
FIGS. 4A-4F provide an example of how an update can be deployed via an express update deployment system in accordance with one or more embodiments of the present invention.

FIGS. 4A-4E provide an example, which continues the example of FIGS. 3A-3C, of how update 300 can be deployed to computing devices 120 using an express update deployment system that is configured in accordance with one or more embodiments of the present invention. Turning to FIG. 4A, based on the assumption that management server 230 selected computing devices 120-1 through 120-100 to prioritize based on their hardware weights, in step 1, management server 230 can instruct agent 200 on computing devices 120-1 through 120-100 to download update 300 from file repository 110 and install it. Notably, because the number of computing device 120 that are initially selected to be prioritized matches the maximum number of concurrent downloads that file repository 110 supports, each of computing devices 120-1 through 120-100 should be able to download update 300 from file repository 110 without being placed in a job queue. Although not shown, this instruction could include an indication that agent 200 should maintain update 300 (or at least parts of update 300) even after it is installed (e.g., as a stream in memory) so that agent 200 can use the stored update 300 when it commences functioning as a proxy file repository.

Figure 4B:
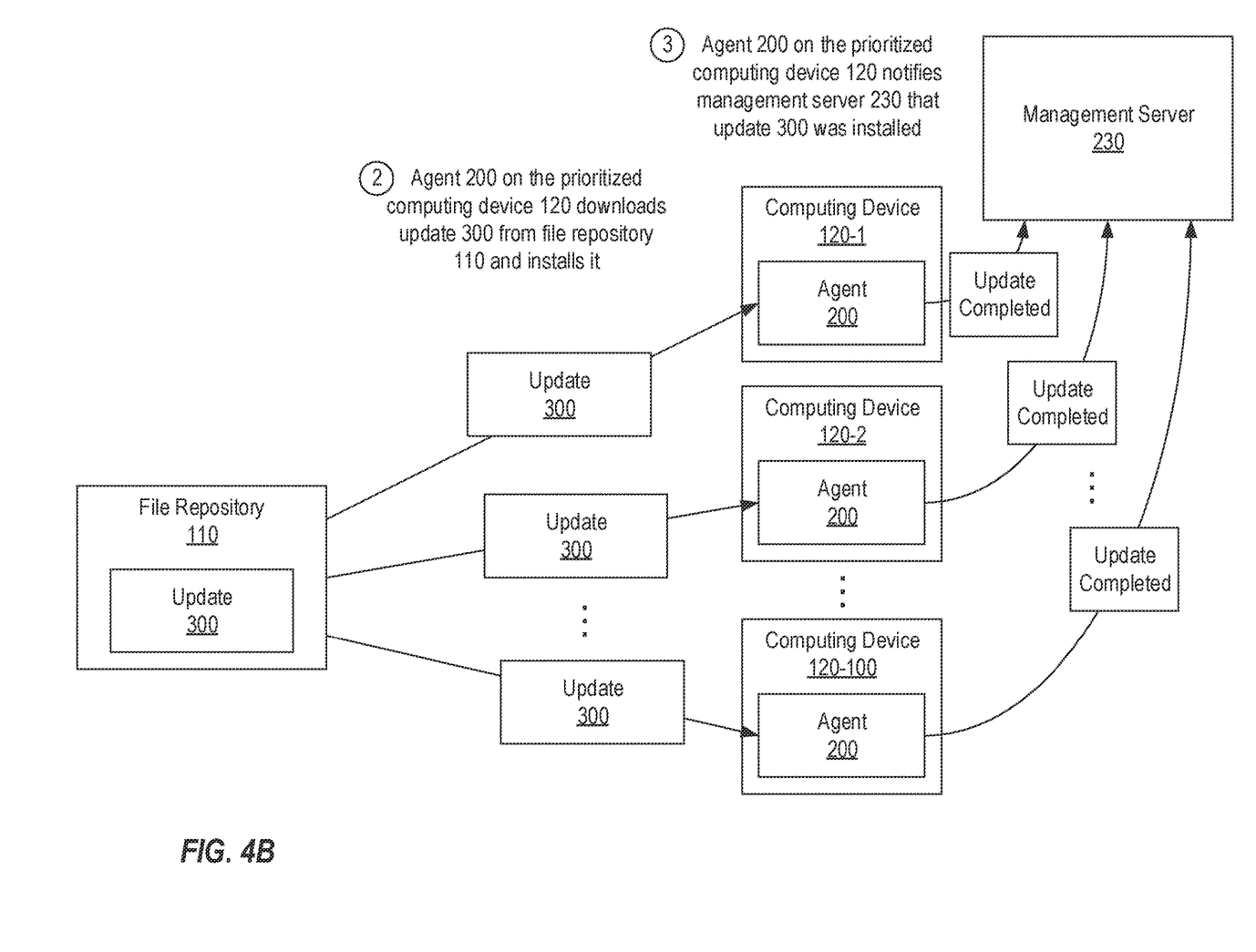

Turning to FIG. 4B, in step 2, agent 200 on each of computing devices 120-1 through 120-100 downloads update 300 from file repository 110 and installs it. Then, in step 3, agent 200 on each of computing devices 120-1 through 120-100 notifies management server 230 that update 300 was successfully installed. As stated above, agent 200 may retain update 300 on the respective computing device 120.

Figure 4C:
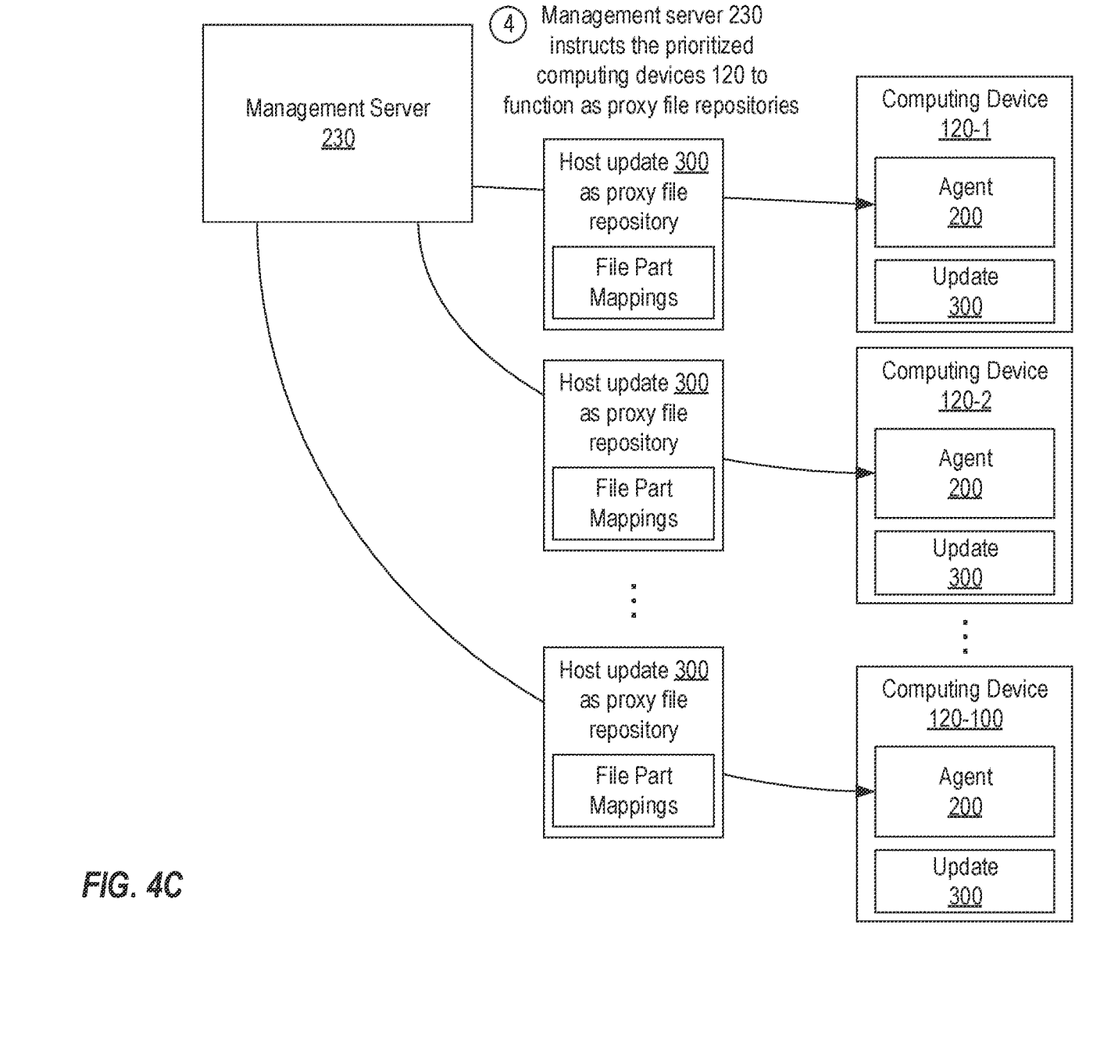

Turning to FIG. 4C, in step 4, management server 230 can instruct agent 200 on each of computing devices 120-1 through 120-100 to host update 300 as a proxy file repository and may provide file part mappings for this purpose. Step 4 could be performed after step 3 but could also be performed as part of step 1. In other words, management server 230 could notify agent 200 on computing devices 120-1 through 120-100 before or after agent 200 downloads and installs update 300 that it will function as a proxy file repository for update 300. FIG. 4C also represents that update 300 (or at least parts of update 300) is maintained on each of computing devices 120-1 through 120-100 (e.g., as a stream stored in memory).

Figure 4D:
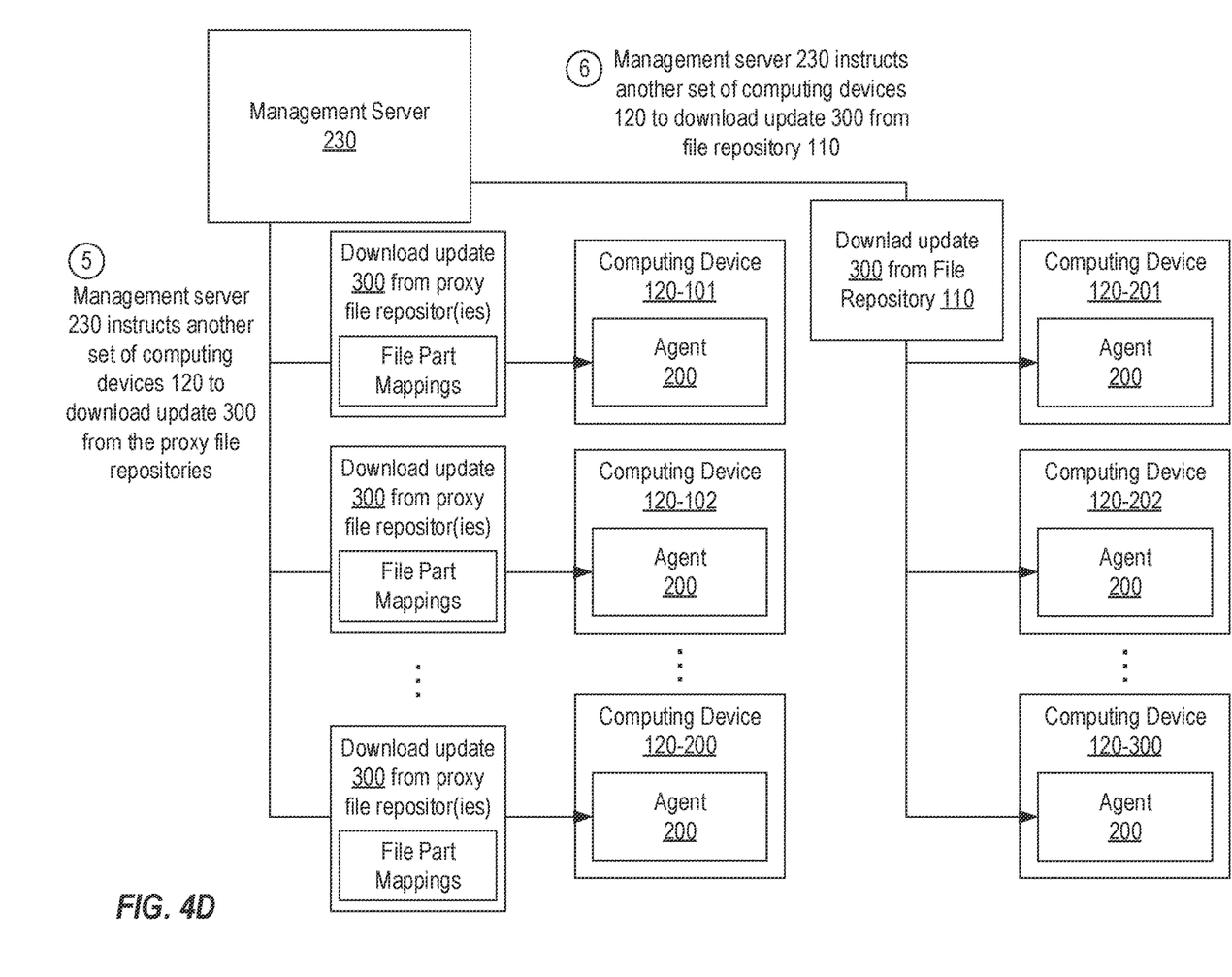

Turning to FIG. 4D, in step 5, management server 230 can instruct another set of computing devices 120-101 through 120-200 to download update 300 from computing devices 120-1 through 120-100 which are now functioning as proxy file repositories. As shown, this instruction can include file part mappings. Also, in step 6, management server 230 can instruct another set of computing devices 120-201 through 120-300 to download update 300 from file repository 110. Accordingly, with computing devices 120-1 through 120-100 functioning as proxy file repositories, the express update deployment system enables concurrent downloads of update 300 from file repository 110 and the proxy file repositories.

In the depicted example, each set of computing devices 120 at this second iteration of the update deployment process includes 100 computing devices 120—the assumed maximum number of concurrent downloads that file repository 110 supports. For the set that is instructed to download update 300 from file repository 110, limiting the set to the maximum number of concurrent downloads can minimize the likelihood that any of computing devices 120-201 through 120-300 will be placed in a job queue. In contrast, in some embodiments, the set that is instructed to obtain update 300 from the proxy file repositories could include a number of computing devices 120 equal to the number of computing devices 120 that are functioning as proxy file repositories—a number that may increase at each iteration of the update deployment process. However, the set that is instructed to obtain update 300 from the proxy file repositories could include any reasonable number of computing devices 120 and could be selected based on factors other than the number of proxy file repositories (e.g., network congestion).

In some embodiments, the sets of computing devices 120-101 through 120-300 selected in this second iteration of the update deployment process could be those with the next highest hardware weights after those of the initial set of computing device 120-1 through 120-100. In other words, management server 230 could select computing devices 120-101 through 120-300 for prioritized deployment of update 300 based on their hardware weights so that they may subsequently function as proxy file repositories.

Figure 4E:
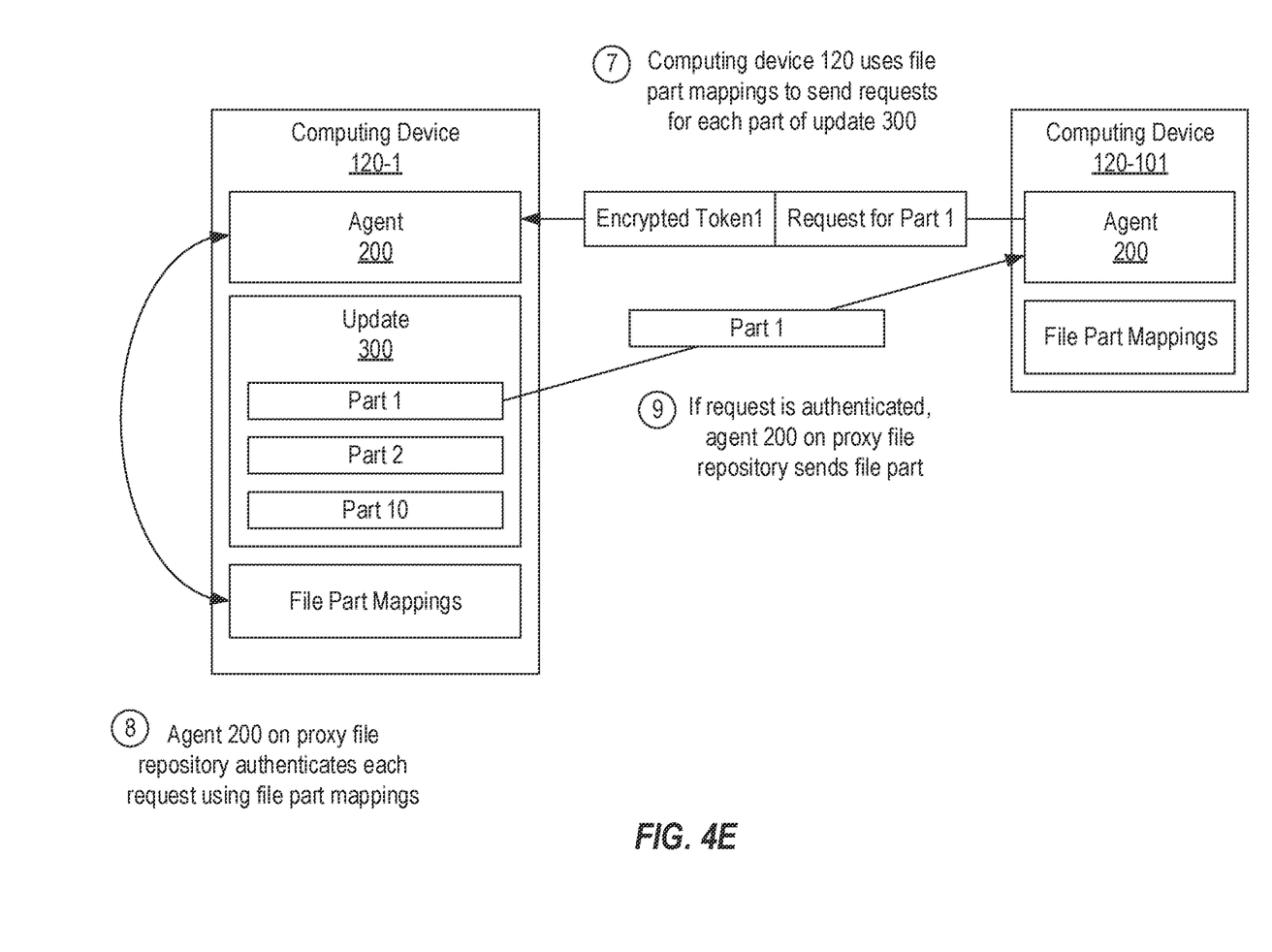

In response to the instruction to download update 300 from file repository 110, agent 200 on computing devices 120-201 through 120-300 can obtain and install update 300 and notify management server 230 accordingly in a similar manner as represented in FIG. 4B. In contrast, in response to the instruction to obtain update 300 from the proxy file repositories, agent 200 on computing devices 120-101 through 120-200 can use the file part mappings as represented in FIGS. 4E and 5.

Figure 5:
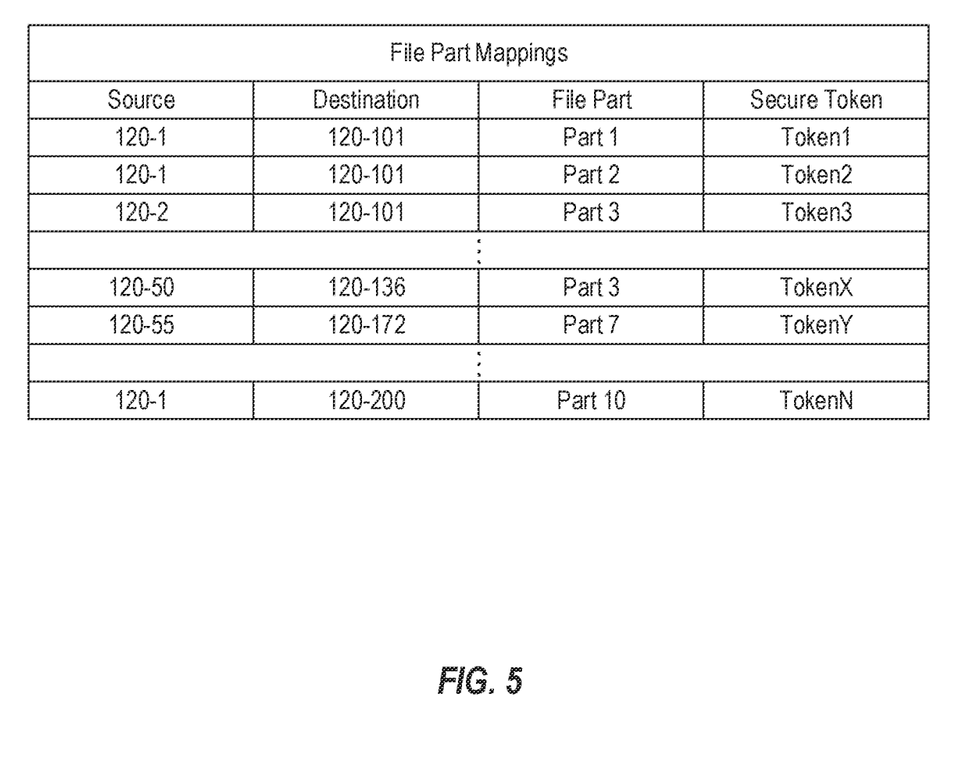
FIG. 5 provides an example of file part mappings that can be used when deploying an update via an express update deployment system in accordance with one or more embodiments of the present invention.

FIG. 5 provides an example of how the file part mappings could be configured in one or more embodiments of the present invention. In general terms, the file part mappings can define from which computing device 120 that is functioning as a proxy file repository (the source) a particular computing device 120 (the destination) should obtain each of the file parts of update 300. For example, in FIG. 5, the file part mappings are in the form of a table having columns for a source (e.g., an IP address or other identifier of a computing device 120 functioning as a proxy file repository), a destination (e.g., an IP address or other identifier of a computing device 120 that is to obtain a file part from a proxy file repository), a file part and secure token. Accordingly, a row in this table can identify a particular part of update 300 that a particular computing device 120 should obtain from another particular computing device 120 that is functioning as a proxy file repository and may provide a particular secure token to be used to authenticate a request to obtain the particular part. Although not shown, the file part mappings can also identify the offset of each file part.

In the case of computing device 120-101, agent 200 could determine that it should obtain part 1 of update 300 from computing device 120-1 using token1 for authentication, that it should obtain part 2 of update 300 from computing device 120-1 using token2 for authentication, that it should obtain part 3 of update 300 from computing device 120-2 using token3 for authentication, etc. In contrast, in the case of computing device 120-136, agent 200 could determine that it should obtain part 3 of update 300 from computing device 120-50 using tokenX for authentication, etc. Accordingly, agent 200 could determine where it should obtain each part of update 300 by finding each row in the file part mappings having a destination that matches the respective computing device 120.

In some embodiments, management server 230 could share the same file part mappings with each proxy file repository and each computing device 120 that it instructs to obtain update 300 from the proxy file repositories. In contrast, in other embodiments, management server 230 could create separate file part mappings for each of these computing devices 120 (e.g., file part mappings that pertain only to the computing device 120 to which the file part mappings are sent). Accordingly, embodiments of the present invention should not be limited to any particular format or structure of the file part mappings.

FIG. 4E provides an example of how a computing device 120 can obtain a file part from another computing device 120 that is functioning as a proxy file repository. In step 7, agent 200 on computing device 120-101 can use the file part mappings to create and send a request to agent 200 on computing device 120-1 for part 1 of update 300. In some embodiments, agent 200 on computing device 120-101 can encrypt the secure token defined for the respective part of update 300, which is token1 in this example, and include the encrypted token in the request (e.g., in the header of an HTTP request).

In step 8, and in response to receiving the request for part 1 of update 300, agent 200 on computing device 120-1 can access the file part mappings that it stores to authenticate/verify the request. For example, agent 200 on computing device 120-1 could determine whether the file part mappings indicate that computing device 120-101 should obtain part 1 from computing device 120-1 (e.g., by determining whether a row in the file part mappings includes computing device 120-1 as the source, computing device 120-101 as the destination and part 1 as the part). Agent 200 on computing device 120-1 may also verify the encrypted token included in the request. For example, agent 200 on computing device 120-1 could obtain the secure token from the file part mappings that it stores, encrypt it (e.g., using a shared key) and compare it to the encrypted token in the request. If they match, the request will be authenticated, and, in step 9, agent 200 on computing device 120-1 can send part 1 to agent 200 on computing device 120-101. Steps 7-9 can be performed to obtain all parts of update 300 from the specified proxy file repositories.

Figure 4F:
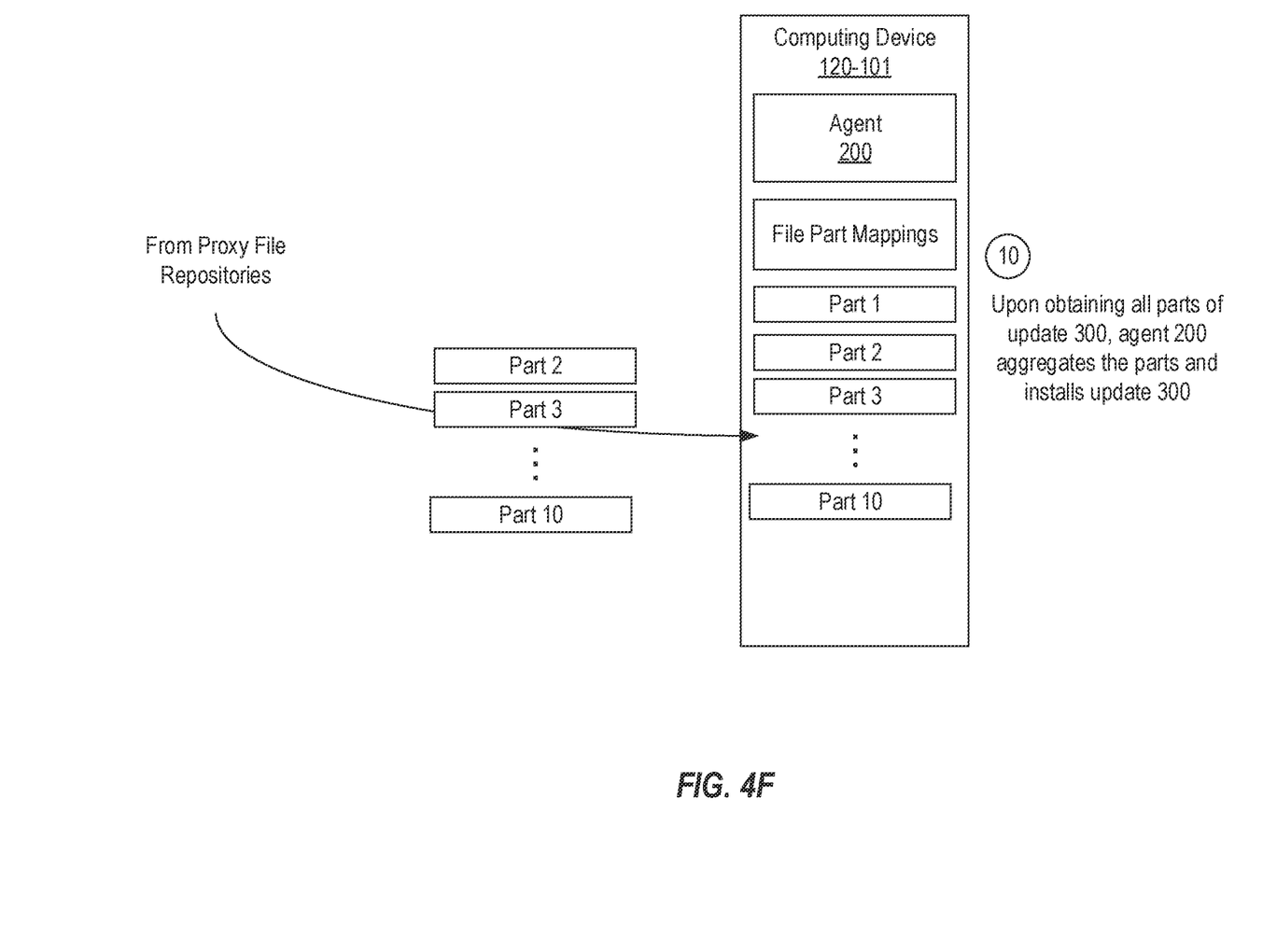

Finally, turning to FIG. 4F, in step 10, upon receiving all parts of update 300 from the proxy file repositories, agent 200 on computing device 120-101 can aggregate the file parts (if necessary) and install update 300. Agent 200 on each of computing devices 120-101 through 120-200 can perform steps 7-10 to cause update 300 to be installed and can then notify management server 230 that installation was successfully completed.

As each of computing devices 120-101 through 120-300 reports back to management server 230 that update 300 has been successfully installed, management server 230 could select any or all of such computing devices 120 to commence functioning as a proxy file repository. For example, as suggested above, management server 230 can prioritize the deployment of update 300 to computing devices 120 based on hardware weight and this prioritization can extend beyond the first iteration of the update deployment process. With such an approach, the number of computing devices 120 that are functioning as proxy file repositories can grow at each iteration. In some embodiments, each computing device 120 on which update 300 has been installed can commence functioning as a proxy file repository. In other embodiments, the number of computing devices 120 which may simultaneously function as a proxy file repository can be limited. In some embodiments, a computing device 120 may function as a proxy file repository only during a specified number of iterations. In some embodiments, any computing device 120 having a hardware weight in excess of a threshold may be used as a proxy file repository. Accordingly, management server 230 may employ a variety of techniques to determine which computing devices 120 and the number of computing devices 120 that will function as proxy file repositories at each iteration of the update process.

In some embodiments, management server 230 may change or update the division of update 300 into file parts at a particular iteration of the update process. For example, management server 230 can use the hardware details of the computing devices 120 that will function as proxy file repositories during the next iteration to determine the file parts that will be used during the next iteration. Additionally or alternatively, management server 230 can use the number of computing devices 120 that will function as proxy file repositories during the next iteration to determine the file parts that will be used during the next iteration.

In some embodiments, the use of an express update deployment system can provide an exponential increase in the number of computing devices 120 to which an update can be deployed. In comparison, prior art techniques for deploying an update via a file repository provide only a linear increase.

For example, using an express update deployment system that includes a file repository that supports 100 concurrent downloads, the aggregated number of devices that are updated over five iterations may be 100, 220, 364, 856 and 1747. In contrast, using the file repository alone, the aggregated number of devices updated over the same five iterations would be 100, 200, 300, 400 and 500. Accordingly, embodiments of the present invention can allow a much larger number of computing devices to be updated during the same time window without the added cost or hassle of increasing the number of file repositories.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for deploying an update to computing devices, the method comprising:
   identifying a first set of the computing devices based on hardware details of the computing devices by calculating hardware weights for the computing devices based on the hardware details of the computing devices;
   instructing the first set of the computing devices to obtain the update from a file repository; and
   in response to the first set of the computing devices obtaining the update from the file repository, instructing a second set of the computing devices to obtain the update from the first set of the computing devices.

2. The method of claim 1, wherein the hardware details include one or both of CPU details and RAM details.

3. The method of claim 1, wherein identifying the first set of the computing devices based on hardware details of the computing devices comprises determining that the hardware weights of the first set of the computing devices exceeds the hardware weights of the computing devices that are not in the first set.

4. The method of claim 2, wherein the CPU details include one or more of a frequency, a number of cores or a utilization percentage.

5. The method of claim 2, wherein the RAM details include one or more of a RAM type weight value, a size or an amount used.

6. The method of claim 1, wherein instructing the second set of the computing devices to obtain the update from the first set of the computing devices comprises providing file part mappings to the second set of the computing devices.

7. The method of claim 6, wherein the file part mappings identify from which of the first set of computing devices each of multiple parts of the update should be obtained.

8. The method of claim 6, wherein the file part mappings identify an offset for each of multiple parts of the update.

9. The method of claim 6, wherein the file part mappings identify a secure token for each of multiple parts of the update.

10. The method of claim 6, further comprising:
    providing the file part mappings to the first set of the computing devices.

11. The method of claim 1, further comprising:
    in response to the first set of the computing devices obtaining the update from the file repository, instructing a third set of the computing devices to obtain the update from the file repository.

12. The method of claim 1, further comprising:
    in response to the second set of the computing devices obtaining the update from the first set of the computing devices, instructing a third set of the computing devices to obtain the update from the second set of the computing devices.

13. The method of claim 1, further comprising:
    in response to the second set of the computing devices obtaining the update from the first set of the computing devices, instructing a third set of the computing devices to obtain the update from the first set and the second set of the computing devices.

14. A method for deploying an update to computing devices, the method comprising:
    identifying a first set of computing devices based on hardware details of the computing devices by calculating hardware weights for the computing devices based on the hardware details of the computing devices;
    instructing the first set of the computing devices to obtain the update from a file repository;
    obtaining, by the first set of the computing devices, the update from the file repository;
    receiving, by the first set of the computing devices, requests to function as proxy file repositories, the requests including file part mappings;

receiving, by the first set of the computing devices and from a second set of the computing devices, requests for parts of the update;

using, by the first set of the computing devices, the file part mappings to verify the requests for the parts of the update; and upon verifying the requests for the parts of the update, sending, by the first set of the computing devices, the parts of the update to the second set of the computing devices.

15. The method of claim 14, wherein the file part mappings identify from which of the first set of computing devices each of the second set of the computing devices should obtain the parts of the update.

16. The method of claim 14, wherein using the file part mappings to verify the requests for the parts of the update comprises using secure tokens defined in the file part mappings to verify secure tokens included in the requests for the parts of the update.

17. One or more computer storage media storing computer executable instructions which when executed implement a method for deploying an update to computing devices, the method comprising:

identifying, by a management server, a first set of the computing devices based on hardware details of the computing devices by determining that a hardware weight of the first set of the computing devices is greater than a hardware weight of the computing devices that are not in the first set;

instructing, by a management server, the first set of the computing devices to obtain the update from a file repository;

in response to the first set of the computing devices obtaining the update from the file repository, instructing, by a management server, a second set of the computing devices to obtain parts of the update from the first set of the computing devices; and instructing, by a management server, a third set of the computing devices to obtain the update from the file repository while the second set of the computing devices obtain the parts of the update from the first set of the computing devices.

18. The computer storage media of claim 17, wherein the method further comprises:

in response to the second set of the computing devices obtaining the parts of the update from the first set of the computing devices, instructing a third set of the computing devices to obtain the parts of the update from the first set and the second set of the computing devices.

* * * * *